United States Patent [19]

Kobrinetz

[11] 4,010,327
[45] Mar. 1, 1977

[54] COMMUNICATION SYSTEM INTERFACE CIRCUIT

[75] Inventor: Anthony Kobrinetz, Chicago, Ill.

[73] Assignee: Motorola, Inc., Schaumburg, Ill.

[22] Filed: May 11, 1976

[21] Appl. No.: 685,223

[52] U.S. Cl. .............................. 179/41 A; 325/54; 325/304
[51] Int. Cl.² ........................................ H04Q 7/04
[58] Field of Search .......... 179/41 A, 2.5 B, 170 D; 325/53, 54, 304, 67; 333/4, 5, 11, 25

[56] References Cited

UNITED STATES PATENTS

| | | | |
|---|---|---|---|
| 2,190,546 | 2/1940 | Laube | 325/54 |
| 2,870,326 | 1/1959 | Sterwer | 325/54 |
| 2,985,755 | 5/1961 | Giesselman | 325/54 |
| 3,764,915 | 10/1973 | Cox et al. | 325/53 |
| 3,898,390 | 8/1975 | Wells et al. | 179/41 A |
| 3,984,776 | 10/1976 | Stedman | 325/304 |

Primary Examiner—William C. Cooper
Assistant Examiner—Gerald L. Brigance
Attorney, Agent, or Firm—Victor Myer; James W. Gillman

[57] ABSTRACT

A communication system includes a mobile station, a plurality of base stations and a central terminal. Each base station converts RF signals from the mobile station to AF signals. The AF signals are carried over a balanced line to the central terminal. Each base station generates a DC voltage signal whose level is representative of the level of its received RF signal. The central terminal includes means to monitor DC current levels, from each base station, on the balanced line and select that base station producing the highest DC current.

The unique interface circuit senses the base station generated DC voltage, which is referenced to a fixed ground potential, and produces a corresponding current which is referenced to a floating ground potential. This current is then coupled to the balanced line for transmission to the central terminal. The interface circuitry includes a DC to AC converter which converts the DC signal voltage to an AC signal. This AC signal is capacitively coupled to an AC to DC converter which generates a corresponding DC voltage. The final stage is a transconductance circuit which produces an output current presenting the DC voltage level generated by the AC to DC converter. In this manner, a ground referenced voltage is transformed to a floating ground reference current suitable for transmission down a balanced line.

15 Claims, 3 Drawing Figures

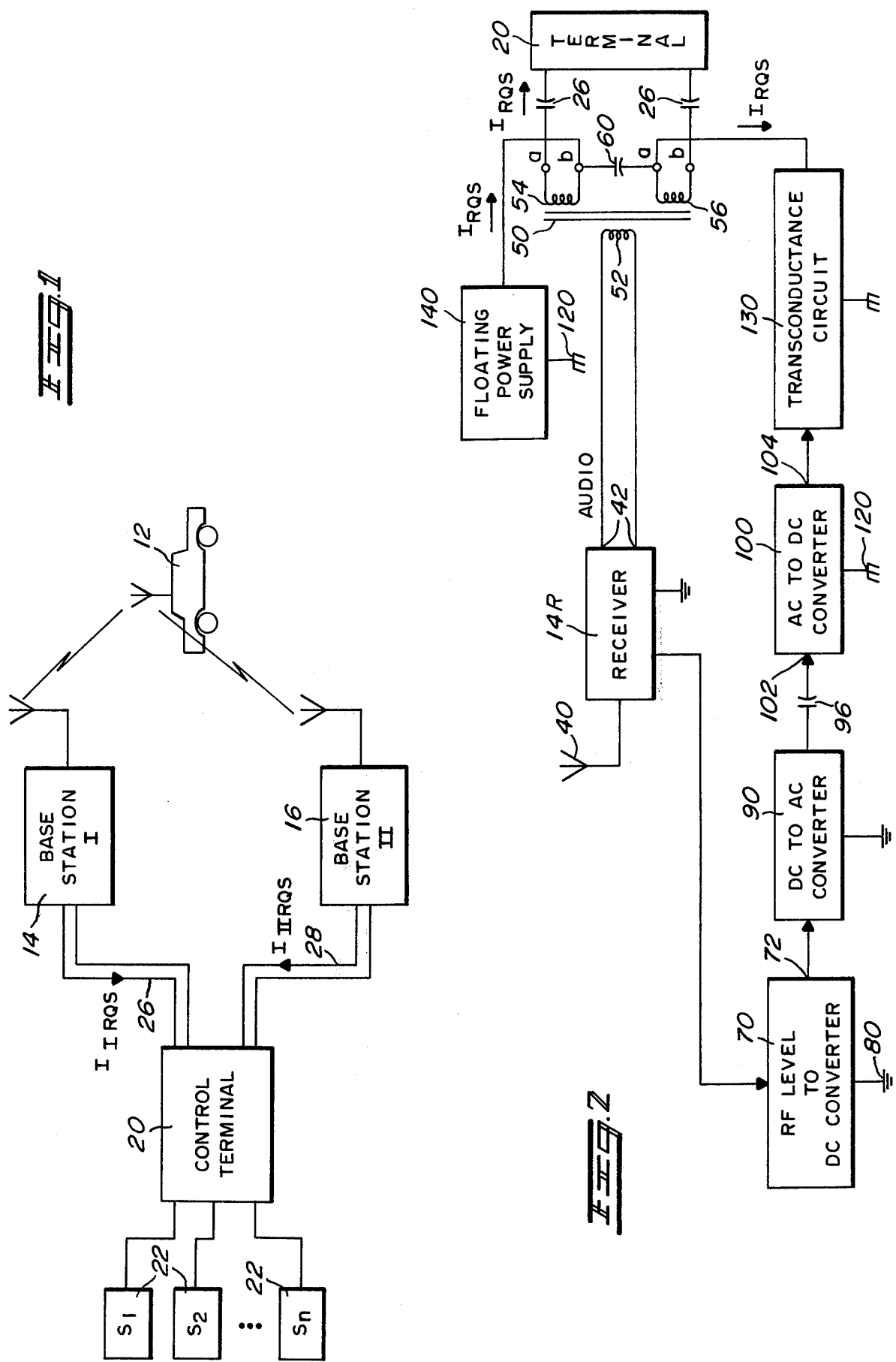

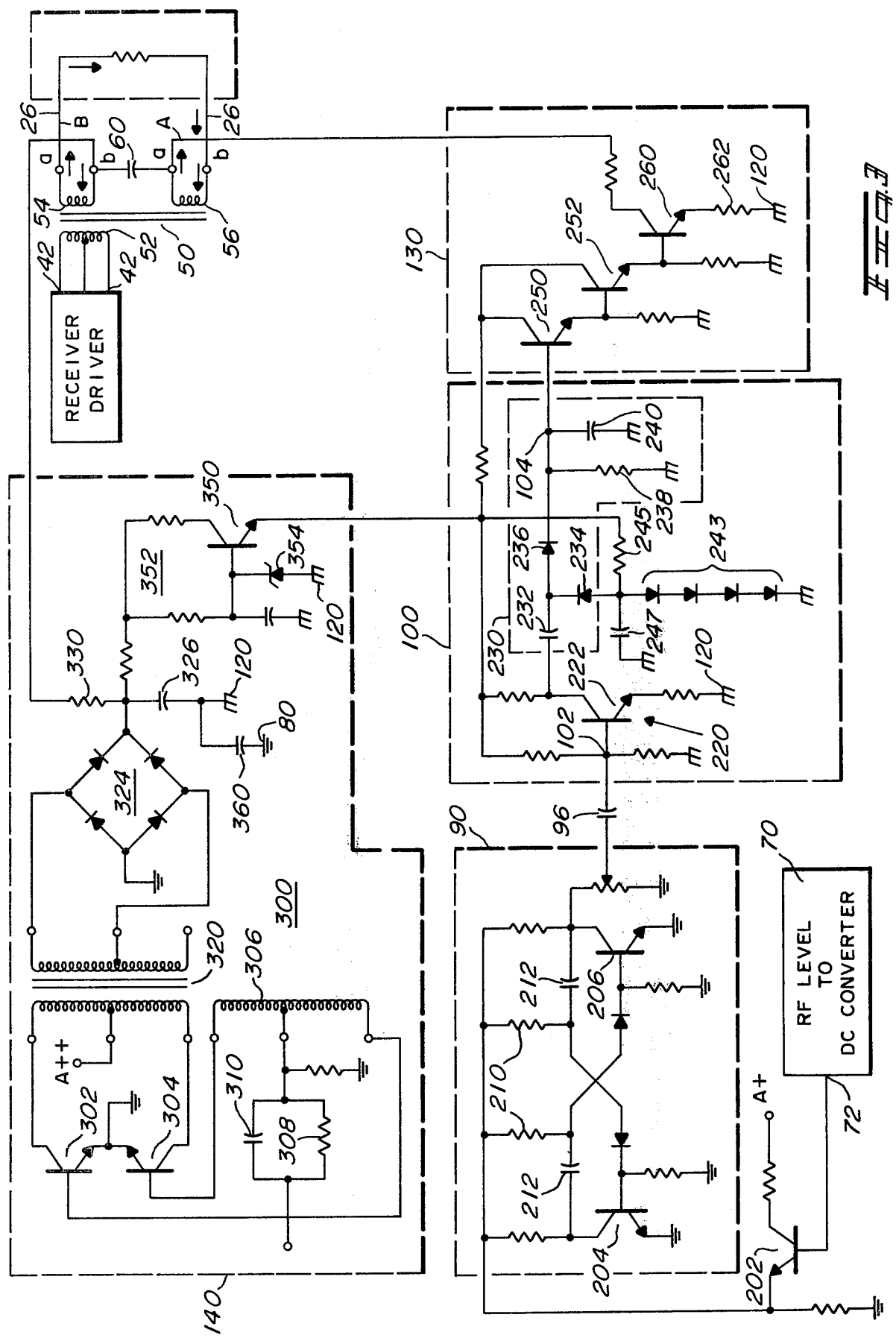

COMMUNICATION SYSTEM INTERFACE CIRCUIT

BACKGROUND OF THE INVENTION

The present invention pertains to the communications art and, more particularly, to an interface circuit for use in a mobile telephone communication system.

Mobile telephone systems are well known in the communications art. In such systems, a mobile telephone such as in a car, transmits an RF signal which may be received by any of a plurality of base stations. The base stations are geographically located to provide coverage for any mobile station within the service area. Each base station includes a receiver and transmitter operating on selected RF frequencies. Upon reception of a mobile RF signal, a base station receiver demodulates the signal to audio, which is then applied on a balanced line which connects with a central terminal. Balanced lines generally have two leads, each of which is isolated from a reference ground potential. Thus, "hum" induced in the lines, as from nearby electrical power carrying wires, creates a common mode signal on the balanced line. In the known manner, this common mode signal may be rejected whereby the received signal is virtually hum free.

The balanced line, or lines from each base station feed to a central terminal. The terminal then performs operations such as determining whether or not the mobile station is an authorized one and, if so, connecting the mobile to the subscriber he is calling.

A problem with such mobile telephone systems is that a mobile station is often in the area of two or more base stations. Thus, each base station sends the appropriate audio information back to the central terminal. Normally one base station will be receiving a "cleaner" signal from the mobile than another station. It is desirable that the central terminal have a means for determining which of the several base station audio signals should be sent to the subscriber. Since the audio signals from the base station to the terminal have been derived from an FM RF signal mere amplitude of the signal, alone, does not determine which of the base station audio signals is superior.

A means has been developed for each base station to send a DC signal to the terminal, which DC signal is representative of the receiver quieting level at the base station. For FM receivers, increased quieting level corresponds to receiving a stronger RF signal. Thus, terminals are commonly provided with a means to detect which of the several base stations receiving an audio signal is also providing, over the balanced line, the highest DC receiver quieting signal or, in other words, which is providing the highest receiver quieting signal DC current.

Since the receiver quieting signal generated by a base station receiver is referenced to ground potential, and since the balanced line is isolated from reference ground, that is, it has a floating ground, the receiver quieting signal must be processed before it can be put on the balanced line. In the prior art, it has been known to create a floating ground by using power transformers which couple to the power mains provided signal. While this system is acceptable for base stations which may be connected to a source of AC power, such transformer isolated systems are not usable where a base station is to be permanently, or occasionally run off a DC supply, such as a battery. Hence, the art has felt a need for a means operable off a DC supply to transmit a DC signal, which is referenced to ground, down a balanced line.

SUMMARY OF THE INVENTION

It is an object of this invention, therefore, to provide an improved interface circuit, for use in a mobile telephone system, wherein a DC signal, referenced to ground potential, is suitably processed for application to, and transmission down a balanced line.

It is a further object of the invention to provide the above described interface circuit which is operable off of a DC power supply.

Briefly, according to the invention, a communication system includes first and second stations. The first station generates a DC signal voltage referenced to ground potential. The two stations are intercoupled by a balanced line, which line is isolated from the ground potential. The improvement to the system comprises a DC to AC converter which converts the DC signal voltage to a corresponding AC signal voltage. The AC signal voltage is AC coupled, but DC blocked, to an AC to DC converter. The AC to DC converter converts the AC signal to a corresponding DC signal, which DC signal is now referenced to a floating ground. The DC signal from the AC to DC converter is coupled via a line coupling means to the balanced line for transmission of the signal to the second station.

BRIEF DESCRIPTION OF THE DRAWINGS

FIG. 1 illustrates a mobile telephone system in block diagram form;

FIG. 2 illustrates the interface circuit, according to the invention, in block diagram form; and FIG. 3 is a detailed schematic diagram of the inventive interface circuit.

DESCRIPTION OF THE PREFERRED EMBODIMENT OF THE INVENTION

Referring to FIG. 1, there a mobile telephone system is shown which includes a mobile station 12, first and second base stations 14, 16 respectively, a central terminal 20, and a plurality of subscribers 22. The mobile station 12, here shown as located within an automotive vehicle, is provided with radio frequency transmitting and receiving equipment. When a mobile station 12 operator picks up his telephone, code signals are transmitted out over the mobile antenna to nearby base stations, as for example first and second base stations 14 and 16. While FIG. 1 illustrates two base stations, it should be understood that a mobile telephone system may include any number of base stations, each one being geographically located to provide coverage over a given service area.

On reception of the RF signal from the mobile station 12, each base station 14, 16 demodulates the signal to a corresponding audio signal. This audio signal is then applied to the balanced lines 26, 28 which intercouple each base station to the central terminal 20.

Each balanced line 26, 28 comprises a pair of wires which are commonly twisted together and routed over land lines. By balanced it is meant that neither line is referenced to ground potential, that is, each line floats. This is advantageous since nearby power carrying wires induce an audible AC signal into the balanced line leads. Since each balanced line lead is floating, the induced signals appear as a common mode signal on each line. Therefore, using known techniques, the common mode power induced signal may be rejected at the central terminal 20, whereby the audio signal thereat is relatively hum free.

Upon receiving the audio signal from the base stations 14, 16 the central terminal 20 performs several functions. First, it analyzes the coded, or preamble signal from the mobile 12 to determine whether or not that mobile is authorized to operate on the system. If it is not so authorized the central terminal will deny the mobile's requested comunication. However, if the mobile 12 is recognized by the central terminal 20, the terminal will in turn connect the mobile to the particular subscriber 22 which the mobile 12 is calling. Once the call is completed intercommunication is accomplished via the balanced lines 26, 28 and the transmitter and receiver of the base stations 14, 16.

Commonly, the RD signal from the mobile station 12 is received by more than one base station. Thus, as is illustrated in FIG. 1, audio signals derived from the same mobile are coupled to the central terminal 20 via both balanced lines 26 and 28. It is desirable that the central terminal 20 include a means to determine which of the plurality of audio signals received is cleaner, i.e. which has the highest signal to noise ratio and lowest distortion. This will correspond to the base station receiver which is receiving the strongest RF signal from the mobile station 12. Since the radio frequency communications between the base stations and the mobile station are frequency modulated, the peak-to-peak size of the audio signal is not an indication of the level of the received radio frequency signal. Therefore, a system has been developed whereby each base station supplies not only the audio signal on the balanced line but also a DC current having a magnitude representative of the RF signal at its base station receiver. In FM systems a measure of the received RF signal strength is the degree of quieting of the receiver. As RF signal strength increases receiver quieting increases. While it is obvious to anyone of ordinary skill in the art that a DC signal may be derived from the receiver quieting level, a particularly superior means for generating a DC signal representative of receiver quieting has been disclosed by Robert B. Stedman in his U.S. patent application entitled "Signal Quality Detector", U.S. Ser. No. 633,209, which application is assigned to the same assignee as the instant invention.

In any event, each base station employs a means to generate a DC signal whose level is representative of the quality of the RF signal received thereat. Unfortunately, the DC signal is referenced to ground potential and, thus, if directly applied to the balanced lines 26, 28 would unbalance the same, resulting in hum pickup down the system. The instant invention is an interface circuit which processes the ground referenced DC signal quality signal at each base station, and generates a corresponding receiver quality signal current which is suitable for application to, and transmission down the balanced line.

FIG. 2 is a block diagram illustrating operation of the inventive interface circuit. The primary components of the interface circuit are located within each base station, here for illustration purposes base station 14. Radio frequency signals are carried from the base station antenna 40 to the base station receiver 14R. These frequency modulated radio frequency signals are demodulated by a receiver 14R, which produces corresponding audio signals at its audio output terminals 42. The audio output terminals 42 of the receiver 14R couple to the primary winding 52 of a line coupling transformer 50. Line coupling transformer 50 has first and second secondary windings 54, 56 each of which has first and second terminals $a$, $b$ respectively. The first terminal of the first secondary 54$a$, and the second terminal of the second secondary winding 56$b$ are connected to the balanced line 26 which in turn leads to the central terminal 20. The second terminal of the first primary winding 54$b$, is coupled to the first terminal of the second secondary winding 56$a$ by a coupling capacitor 60 which is of selected value such that the terminals it interconnects are at substantially the same AC potential. Thus, the audio signals applied to transformer primary winding 52 are differentially coupled to the balanced line 26.

Coupled to the RF receiver 14R is an RF level to DC converter 70. Converter 70 monitors the quieting level of receiver 14R and produces a DC receiver quality signal in response thereto at its output 72. As mentioned hereinabove, in an FM receiver the degree of receiver quieting is a direct indication of the magnitude of the received RF signal. While the converter 70 may be derived from any of several known means, a preferred circuit for performing this function is disclosed in the above identified U.S. patent application Ser. No. 623,209, invented by Robert B. Stedman. The output from the converter 70 at output terminal 72 is a DC signal referenced to chassis or earth ground 80. If this signal were directly applied to the secondary windings 54, 56 of line coupling transformer 50 the lines 26 would be unbalanced whereby hum might be induced on the lines 26 via adjoining power carrying cables. To avoid this problem, the converter 70 output at terminal 72 couples to a DC to AC converter 90. This converter produces an AC output which corresponds to the DC signal voltage at converter terminal 72. The AC signal output from converter 90 is AC coupled, and DC blocked via coupling capacitor 96 to the input terminal 102 of an AC to DC converter 100. AC to DC converter 100 produces at its output 104 a DC signal representative of the magnitude of the AC signal received at its input 102. However, converter 100 is referenced not to ground potential 80 but to a floating ground potential 120. The output from converter 100 at terminal 104 connects to the input of a transconductance circuit at 130. Transconductance circuit 130 converts the voltage output from the AC to DC converter 100 to a corresponding current $I_{RQS}$. This current originates from a current source having a high internal impedance. The high impedance current source from the transconductance circuit 130 connects to the first terminal of the second secondary winding 56$a$.

Connected to the second terminal of the first primary winding 54$b$ is a floating power supply 140. Power supply 140 generates a DC bias potential which is referenced to floating ground potential 120. The floating power supply 140 may also be used to apply bias to the AC to DC converter 100 and the transconductance circuit 130.

System operation may be understood as follows. The demodulated FM signals at the receiver 14R output terminals 42 couple to the primary of line coupling transformer 50. The coupling transformer 50 induces a differential signal on balanced line 26 corresponding to the audio signal.

The RF level to DC converter circuit 70 senses the degree of receiver 14R quieting and generates an output DC receiver quality signal at its output terminal 72.

The DC receiver quieting signal at output 72 is referenced to chassis or circuit ground 80. This signal is in turn applied to the DC to AC converter which produces a corresponding AC signal voltage output. The AC signal output from converter 90 is AC coupled through coupling capacitor 96 to the input 102 of the AC to DC converter 100. Produced at the output of AC to DC converter 100 is a DC signal, which DC signal corresponds to the DC signal at converter 70 output terminal 72, however, it is referenced to the floating ground potential 120. The DC voltage output from converter 100 is in turn sensed by the transconductance circuit 130 which produces a corresponding receiver quality signal current $I_{RQS}$.

A DC circuit is created from the floating power supply 140 through the first secondary winding 54 of line coupling transformer 50 through the terminal 20 back through the second secondary winding 56 and through the transconductance circuit 130 to ground potential. The current conducted through this path is determined by the transconductance circuit 130, which current is exactly the receiver quieting signal current $I_{RQS}$. Thus, the terminal 20 is provided a DC current whose magnitude is representative of the level of the RF signal received by the receiver 14R. Because the output impedance of the transconductance ciruit 130 is very high, and since the floating power supply 140 and transconductance circuit 130 are both referenced to a floating ground 120 there is no unbalance caused by the interface circuit to the balanced line 26. Thus, the interface circuit provides a means for converting a DC signal referenced to ground potential to a corresponding current, which current may be coupled to a balanced line without affecting the balance thereof.

FIG. 3 is a detailed schematic diagram of the preferred construction of the interface circuit. The receiver audio output at output terminals 42 is shown coupling to the primary 52 of the line coupling transformer 50. The secondary windings 54, 56 having first and second terminals a, b are as shown in FIG. 2, wherein the first terminal of the first secondary 54a and the second terminal of the secondary 56b couple via the balanced line 26 to the central terminal 20.

The RF level to DC converter 70 feeds through a buffer stage 202 to the input of the DC to AC converter 90. DC to AC converter 90 is comprised of a pair of NPN transistors 204, 206 intercoupled via timing resistors and capacitors 210, 212 respectively, and bias components whereby the collector of transistor 206 produces square waves at a 70 kilohertz rate. The output amplitude of the DC to AC converter 90 taken at the collector of transistor 206 is directly dependent on the output DC voltage from buffer 202, which in turn is the $DC_{RQS}$ signal from the converter 70.

The AC signal from the DC to AC converter 90 is coupled through the coupling capacitor 96 to the input terminal 102 of an AC to DC converter 100. Coupled to the input terminal 102 is an amplifier stage comprised of an NPN transistor 222 which is referenced to a floating ground potential 120. The bias for this and succeeding stages is provided by the floating power supply 140, which is discussed more fully hereinbelow. The amplified square wave output from amplifying stage 220, taken at the collector of transistor 222 is peak detected in a peak-to-peak detector 230. Peak-to-peak detector 230 is comprised of a series capacitor 232, first and second rectifying diodes 234, 236 respectively and a filter circuit comprised of a shunt resistor 238 and shunt capacitor 240.

Operation of the peak-to-peak detector 230 may be understood as follows. During the negative peak transition of the square wave at the output of amplifier 220 a current path is created through diode 234, capacitor 232, and NPN transistor 222 to the floating ground potential 120. Thus, capacitor 232 charges to the negative peak value of the square wave. When the square wave makes its transition from the negative to positive peak value, the voltage across the capacitor 232 cannot change instantaneously, whereby the voltage applied through diode 236 to resistor 238 and capacitor 240 is a DC voltage representative of the peak-to-peak value of the square wave waveform. Thus, the AC signal input to converter 100 is converted to a corresponding DC output level at the converter output terminal 104, which DC output voltage is representative of the DC voltage $DC_{RQS}$ at the output terminal 72 of the RF level of DC converter 70. However, the DC voltage at terminal 104 is referenced to floating ground potential 120, instead of chassis or earth ground potential 80.

Thermal drift of the succeeding stage is compensated for in the normal manner by a diode string 243 which receives bias via resistor 245, and is filtered via capacitor 247.

The DC voltage at output terminal 104 of AC to DC converter 100 is applied to the input terminal of the transconductance amplifier 130. Transconductance amplifier 130 is comprised of a Darlington connected NPN transistor pair 250, 252. The Darlington pair 250, 252 provides a very high input impedance to the transconductance circuit which creates minimal loading on the output terminal 104 of AC to DC converter 100. The DC voltage appearing at the emitter of transistor 252, which voltage is directly related to the DC voltage at terminal 104 of converter 100, is applied to the base of a common emitter connected NPN transistor 260. Coupled between the emitter of transistor 260 and floating ground potential 120 is an emitter load resistor 262. In the well known manner, the DC voltage applied to the base of transistor 260 causes a corresponding collector current $I_{RQS}$ dependent on the value the emitter load resistor 262. The collector of transistor stage 260, which constitutes the output of the transconductance circuit 130 is at a very high impedance, whereby the current $I_{RQS}$ originates from a very high impedance source. This output, as is shown in FIG. 2, connects to the first terminal of the second secondary winding 56a.

The floating power supply 140 includes a free running astable multivibrator 300 comprised of first and second transistors 302, 304, a feedback winding 306 and a timing circuit comprised of a resistor 308 and capacitor 310. The astable multivibrator 300, which produces a free running AC output at approximately 21 kilohertz, may be biased off of a low DC supply A+ such as a battery. However, the output from astable 300, taken at the collectors of transistors 302, 304 is boosted in level via the turns ratio of transformer 320. In the present example, the A+ voltage may be around 12 volts DC with the secondary of transformer 320 producing a peak-to-peak voltage of 200 or more volts. The AC signal at the secondary of transformer 320 is full wave rectified via rectifier bridge 324, and filtered via filter capacitor 326 which connects to floating ground potential 120.

The filtered DC output from bridge rectifier 324 is coupled through a limiting resistor 330 to the second terminal of the first secondary winding 54a, and to the series pass transistor 350 of a voltage regulator circuit 352. The voltage regulating circuit 352 operates in the normal manner, via transistor 350 and zener diode 354 to produce a DC voltage, here approximately 26 volts, which may be used to bias the converter 100 and transconductance circuit 130.

A capacitor 360 couples between floating ground 120 and a chassis ground 80. This capacitor is selected to have a high impedance at 60 hertz whereby the connections from the full wave bridge 324 to the first secondary of coupling transformer 50 do not unbalance the balance line 26. However, capacitor 360 is chosen to have a low impedance at 21 kilohertz and 70 kilohertz whereby the free running frequencies from the DC to AC converter 90 and the power supply 140 astable 300 are effectively shunted to ground such that they do not radiate to associated circuitry.

As is discussed with reference to FIG. 2, the receiver quieting signal $I_{RQS}$ which is controlled via the transconductance amplifier 130, is passed through the terminal 20 over a path originating at the floating power supply 140 and continuing through the first and second secondary windings 54, 56 of line coupling transformer 50. Because the floating power supply 140 and transconductance amplifier 130 referenced to floating ground potential the signal may be applied to the balanced line 26 without affecting the balance i.e. the isolation from ground potential 80, thereof.

In summary, an improved mobile telephone interface circuit has been described which is capable of converting a DC signal referenced to ground potential to a corresponding signal referenced to a floating ground which may be applied to, for transmission down a balanced line.

While a preferred embodiment of the invention has been described in detail, it should be understood that many modifications and variations thereto are possible, all of which fall within the true spirit and scope of the invention.

I claim:

1. In a communication system having first and second stations, the first station generating a DC signal voltage referenced to a ground potential, the two stations being intercoupled by a balanced line which is isolated from the ground potential, the improvement comprising:
   DC-to-AC converter means for converting said DC signal voltage to a corresponding AC signal voltage;
   AC-to-DC converter means for converting AC signals, at its input, to corresponding DC signals, at its output;
   AC coupling means for AC coupling, but DC blocking, the AC signal voltage, from the DC-to-AC converter, to the input of the AC-to-DC converter; and
   line coupling means for coupling the output of the AC-to-DC converter to the balanced line for transmission to the second station thereon.

2. The improvement of claim 1 wherein the DC-to-AC converter means comprises an astable multivibrator whose peak-to-peak output voltage is representative of the level of the DC signal voltage.

3. The improvement of claim 1 wherein the AC-to-DC converter comprises means for producing an output DC voltage whose magnitude is related to the peak-to-peak value of signals at its input.

4. The improvement of claim 2 wherein the AC-to-DC converting comprises means for producing an output DC voltage whose magnitude is related to the peak-to-peak value of signals at its input.

5. The improvement of claim 1 wherein the AC coupling means comprises a capacitor series connected from the DC-to-AC converter to the input of the AC-to-DC converter.

6. The improvement of claim 4 wherein the AC coupling means comprises a capacitor series connected from the DC-to-AC converter to the input of the AC-to-DC converter.

7. The improvement of claim 1 wherein the line coupling means comprises:
   a transconductance circuit for converting the voltage output from the AC-to-DC converter to a corresponding current, which current originates from a source having a high impedance; and
   means for coupling said current to the balanced line for transmission, to the second station, thereon.

8. The improvement of claim 6 wherein the line coupling means comprises:
   a transconductance circuit for converting the voltage output from the AC-to-DC converter to a corresponding current, which current originates from a source having a high impedance; and
   means for coupling said current to the balanced line for transmission, to the second station, thereon.

9. In a communication system having a mobile station, a plurality of base stations, and a central terminal, wherein each base station converts an RF transmission from a mobile station to an audio signal which is coupled via a two lead balanced line to the central terminal, and wherein each base station generates a DC signal voltage, referenced to a ground potential, representative of the magnitude of its received RF signal, an interface means for coupling the base station audio signal and the DC signal voltage to the balanced line for transmission to the central station comprising:
   a transformer having a primary winding and first and second secondary windings, each secondary winding having first and second terminals;
   a power supply means for producing a DC bias voltage referenced to a floating reference potential;
   means for coupling the audio signal to the transformer primary for AC coupling the audio signal to each transformer secondary winding;
   DC-to-AC converter means for converting said DC signal voltage to a corresponding AC voltage;
   AC-to-DC converter means for converting AC signals, at its input, to corresponding DC signals, referenced to the floating reference potential, at its output,
   AC coupling means for AC coupling, but DC blocking, the AC signal voltage, from the DC-to-AC converter, to the input of the AC-to-DC converter;
   a transconductance circuit for converting the DC signal output from the AC-to-DC converter to a corresponding current, which current is generated by a source having a high impedance;
   means for connecting the DC bias from the power supply means to the second terminal of the first secondary winding;
   means for connecting one lead of the balanced line to the first terminal of the first secondary winding, and for connecting the remaining lead of the balanced line to the second terminal of the second secondary winding; and means for connecting the transconductance circuit to the first terminal of the second secondary winding, whereby a current path is created from the power supply means through the first secondary winding, the central terminal, the second secondary winding and to the transconductance circuit for conduction of said transconductance current.

10. The interface means of claim 9 wherein the DC-to-AC converter means comprises an astable multivibrator whose peak-to-peak output voltage is representative of the level of the DC signal voltage.

11. The interface means of claim 9 wherein the AC-to-DC converter comprises means for producing an output DC voltage whose magnitude is related to the peak-to-peak value of signals at its input.

12. The interface means of claim 10 wherein the AC-to-DC converter comprises means for producing an output DC voltage whose magnitude is related to the peak-to-peak value of signals at its input.

13. The interface means of claim 9 wherein the AC coupling means comprises a capacitor series connected from the DC-to-AC converter to the input of the AC-to-DC converter.

14. The interface means of claim 12 wherein the AC coupling means comprises a capacitor series connected from the DC-to-AC converter to the input of the AC-to-DC converter.

15. The interface means of claim 9 further comprising a means for capacitively coupling the second terminal of the first secondary to the first terminal of the second secondary.

* * * * *